(12) United States Patent
Hillborg et al.

(10) Patent No.: US 11,037,697 B2
(45) Date of Patent: Jun. 15, 2021

(54) SILICONE RUBBER WITH ATH FILLER

(71) Applicant: ABB Power Grids Switzerland AG, Baden (CH)

(72) Inventors: Henrik Hillborg, Västrås (SE); Olof Hjortstam, Västrås (SE); Henrik Lofas, Skultuna (SE); Jonas Birgerson, Borlänge (SE)

(73) Assignee: ABB Power Grids Switzerland AG, Baden (CH)

( * ) Notice: Subject to any disclaimer, the term of this patent is extended or adjusted under 35 U.S.C. 154(b) by 0 days.

(21) Appl. No.: 16/612,950

(22) PCT Filed: May 10, 2018

(86) PCT No.: PCT/EP2018/062170
§ 371 (c)(1),
(2) Date: Nov. 12, 2019

(87) PCT Pub. No.: WO2018/210687
PCT Pub. Date: Nov. 22, 2018

(65) Prior Publication Data
US 2020/0411209 A1    Dec. 31, 2020

(30) Foreign Application Priority Data

May 19, 2017  (EP) .................................. 17171853

(51) Int. Cl.
| | |
|---|---|
| *C08K 3/22* | (2006.01) |
| *H01B 3/46* | (2006.01) |
| *C08K 9/06* | (2006.01) |
| *C08L 83/04* | (2006.01) |

(52) U.S. Cl.
CPC ................. *H01B 3/46* (2013.01); *C08K 3/22* (2013.01); *C08K 9/06* (2013.01); *C08L 83/04* (2013.01); *C08K 2003/2227* (2013.01); *C08K 2201/005* (2013.01); *C08K 2201/011* (2013.01); *C08L 2203/206* (2013.01)

(58) Field of Classification Search
CPC ............................................ C08K 2003/2227
See application file for complete search history.

(56) References Cited

U.S. PATENT DOCUMENTS

| | | | |
|---|---|---|---|
| 6,063,487 A | 5/2000 | Azechi et al. | |
| 7,722,951 B2 | 5/2010 | Li et al. | |
| 2005/0049357 A1* | 3/2005 | Zhong | ..................... C08L 83/04 |
| | | | 524/588 |
| 2006/0084744 A1 | 4/2006 | Kuhn et al. | |
| 2007/0185259 A1* | 8/2007 | Hoshino | ................. C08L 83/06 |
| | | | 524/588 |
| 2010/0173187 A1* | 7/2010 | Nishikawa | .......... H01M 2/1653 |
| | | | 429/129 |
| 2011/0315434 A1* | 12/2011 | Kawamura | .......... H05K 1/0373 |
| | | | 174/256 |

FOREIGN PATENT DOCUMENTS

| | | |
|---|---|---|
| CN | 1923899 A | 3/2007 |
| CN | 101704976 A | 5/2010 |
| CN | 104610754 A | 5/2015 |
| CN | 104893308 A | 9/2015 |
| EP | 0887809 A2 | 12/1998 |
| GB | 1303432 A | 1/1973 |
| JP | 2010100665 A | 5/2010 |
| JP | 2011089079 A | 5/2011 |
| JP | 5897184 B1 | 3/2016 |
| JP | 2016210932 A | 12/2016 |
| WO | 2009059382 A1 | 5/2009 |
| WO | 2015022998 A1 | 2/2015 |

OTHER PUBLICATIONS

International Preliminary Report on Patentability Application No. PCT/EP2018/062170 Completed: Apr. 25, 2019; dated Apr. 25, 2019 14 pages.
International Search Report and Written Opinion of the International Searching Authority Application No. PCT/EP2018/062170 Completed: Jun. 19, 2018; dated Jun. 27, 2018 10 pages.
European Search Report Application No. EP 17 17 1853 Completed: Nov. 14, 2017; dated Nov. 23, 2017 8 pages.
English Translation of Chinese First Office Action for Chinese Application No. 201880031794.4 dated Aug. 5, 2020, 7 pages.
Report Letter of Chinese First Office Action for Chinese Application No. 201880031794.4 dated Oct. 9, 2020, 4 pages.

* cited by examiner

Primary Examiner — Margaret G Moore
(74) Attorney, Agent, or Firm — Sage Patent Group

(57) ABSTRACT

The present disclosure relates to a filled silicone rubber material 2 including at least 20 wt % of alumina tri-hydrate as a filler 4 dispersed in SiR 5 to below the percolation threshold. The ATH is a mixture of a first ATH powder and a second ATH powder. The particle size distribution of the first and second ATH powders are such that the $d_{90}$ value of the second ATH powder is less than the $d_{10}$ value of the first ATH powder. The disclosure also relates to an insulator 1 made from the filled SiR material 2, and to a use of the insulator in a high-voltage direct current application.

16 Claims, 1 Drawing Sheet

SILICONE RUBBER WITH ATH FILLER

TECHNICAL FIELD

The present disclosure relates to a silicone rubber (SiR) comprising alumina tri-hydrate (ATH) as a filler, especially as an electrical insulator, e.g. in high-voltage direct current (HVDC) applications.

BACKGROUND

HVDC products such as HVDC bushings and HVDC cable terminations today often use SiR as an outer insulator exposed to air.

It is known that the hydrophobic surface properties of the silicone rubber are of importance in order to minimize the leakage currents, thereby preventing surface flashovers during wet or polluted conditions.

SUMMARY

It has now been noted that the resistivity of certain types of silicone rubbers may be significantly decreased if allowed to adsorb moisture from the environment. This has been demonstrated by resistivity measurements of silicone rubber plates at various temperatures and humidity. The resistivity of an ATH-filled silicone rubber material may vary with up to six decades during extreme environmental conditions (−15° C. and 25% relative humidity (RH) to 70° C. and 95% RH). Since silicone rubber materials without any ATH filler vary less in resistivity it is assumed that moisture is attracted to the interface between ATH particles and the silicone rubber, thereby increasing the current through the material. During more realistic environmental conditions, the variation in resistivity is lower, but still varies several decades. Since the electric field distribution in an HVDC insulation system is mainly controlled by the resistivity of the different insulation materials and this in the end gives the direct current (DC) withstand properties of the insulation system, the resistivity is an important parameter to control.

The filled SiR material used in today's HVDC insulators have a resistivity that strongly depends on the surrounding humidity and details in how the humidity are diffusing inside the SiR material. Furthermore, any humidity gradients inside a SiR insulator will cause large gradients of the resistivity inside the insulator. This results in uncertainty of the electrical stress inside and around the insulator, both during testing and during operation. This uncertainty increases the risk for failure and can to some extent be circumvented by increased dimensions of the insulator. One reason for this variation in resistivity can be the added flame retardant in the form of particulate ATH which is required in order to pass the required electrical erosion tests, e.g. IEC 60587, at 4.5 kV.

The High-Temperature Vulcanisation (HTV) silicone rubber formulations for HV outdoor insulation are usually heavily filled (ca 50 wt. %) with ATH. The filler particles create a percolated structure through the material, where moisture can penetrate along the interfaces between the ATH particles and the silicone rubber. Since silicone rubber is highly permeable, the moisture can easily adsorb/desorbs from the filler surfaces, depending on the temperature and humidity of the surrounding environment. In moist condition the resistivity of ATH-filled SiR material is typically in the order of 1E9-1E13 Ohm·m. The conduction mechanism is dominated by loosely adsorbed moisture at the interface of the percolated ATH particles. This layer may be removed by reducing humidity of the surrounding air. During dry conditions, or at temperatures below 0° C. the resistivity is higher (typically in the range 1E131E15 Ohm·m) and controlled by a thin layer of bound water molecules, as well as the conductivity of the ATH filler. If the silicone rubbers do not contain ATH fillers, the resistivity is significantly higher compared to the evaluated materials, typically >1E14 Ohm·m, with low influence of ambient humidity.

It is thus important, in order to achieve a high and relatively stable resistivity, also in humid conditions, to reduce or avoid percolation through the filled SiR material, i.e. to be below the percolation threshold. A straight forward way of avoiding percolation is to reduce the amount of ATH filler to below the percolation threshold. However, a high amount of ATH filler is required for the material to pass the required electrical erosion tests. It has now been realized, in accordance with the present invention, that percolation can be avoided, while still having a high enough amount of ATH (as percentage by weight, wt %), by combining ATH particles from two different ATH powders having different sizes, where a first ATH powder has a relatively large particle size and a second ATH powder has a relatively small particle size. The fill content of ATH may then be above what is required for sufficient resistance to electrical erosion, e.g. at least 20 wt % or at least 30 wt %, while still being below the percolation threshold.

According to an aspect of the present invention, there is provided a filled SiR material comprising at least 20 wt % of ATH as a filler dispersed in SiR to below the percolation threshold. The ATH is a mixture of a first ATH powder and a second ATH powder. The particle size distribution of the first and second ATH powders are such that the $d_{90}$ value of the second ATH powder is less than the $d_{10}$ value of the first ATH powder.

According to another aspect of the present invention, there is provided a high-voltage (HV) electrical insulator made from an embodiment of the filled SiR material of the present disclosure.

According to another aspect of the present invention, there is provided a use of an embodiment of the insulator of the present disclosure in an HVDC application.

According to another aspect of the present invention, there is provided a method for preparing a filled SiR material. The method comprises providing a first ATH powder, providing a second ATH powder, dispersing the first and second ATH powders in SiR to at least 20 wt % and below the percolation threshold of the filled SiR material thus formed. The particle size distribution of the first and second ATH powders are such that the $d_{90}$ value of the second ATH powder is less than the $d_{10}$ value of the first ATH powder.

It is to be noted that any feature of any of the aspects may be applied to any other aspect, wherever appropriate. Likewise, any advantage of any of the aspects may apply to any of the other aspects. Other objectives, features and advantages of the enclosed embodiments will be apparent from the following detailed disclosure, from the attached dependent claims as well as from the drawings.

Generally, all terms used in the claims are to be interpreted according to their ordinary meaning in the technical field, unless explicitly defined otherwise herein. All references to "a/an/the element, apparatus, component, means, step, etc." are to be interpreted openly as referring to at least one instance of the element, apparatus, component, means, step, etc., unless explicitly stated otherwise. The steps of any method disclosed herein do not have to be performed in the exact order disclosed, unless explicitly stated. The use of "first", "second" etc. for different features/components of the present disclosure are only intended to distinguish the features/components from other similar features/components and not to impart any order or hierarchy to the features/components.

BRIEF DESCRIPTION OF THE DRAWINGS

Embodiments will be described, by way of example, with reference to the accompanying drawings, in which.

DETAILED DESCRIPTION

Figure 1:
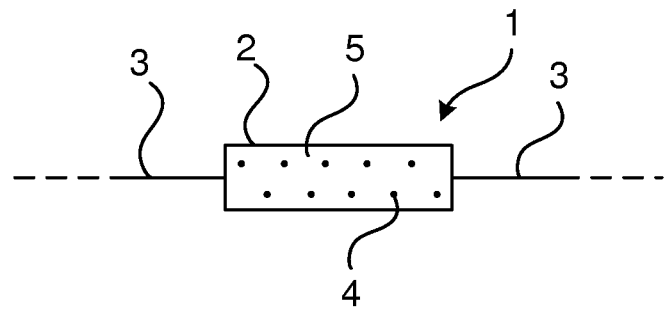
FIG. 1 schematically illustrates an embodiment of an insulator made from the filled SiR material of the present disclosure and arranged around a conductor of an electricity system.

Embodiments will now be described more fully hereinafter with reference to the accompanying drawings, in which certain embodiments are shown. However, other embodiments in many different forms are possible within the scope of the present disclosure. Rather, the following embodiments are provided by way of example so that this disclosure will be thorough and complete, and will fully convey the scope of the disclosure to those skilled in the art. Like numbers refer to like elements throughout the description.

By means of embodiments of the present invention, a filled SiR material having decreased sensitivity to the surrounding humidity is provided. In addition to combining ATH powder particles of different sizes, the ATH particles may be subjected to surface treatment to make them more hydrophobic (e.g. vinyl-silane treatment) and the ATH filler content may be reduced (while still being sufficient in view of electrical erosion), to reduce the influence of humidity on the resistivity of the filled SiR material.

In accordance with embodiments of the present invention, the fill content of ATH is below the percolation threshold for a given temperature and humidity. A percolation function P can be defined from the resistivity ρ dependence on the fill content (wt % of ATH in the filled SiR material).

$$P = \frac{\log(\rho) - \log(\rho_{SiR})}{\log(\rho_{Fill}) - \log(\rho_{SiR})} \quad \text{(eq. 1)}$$

Wherein $\rho$=resistivity of the filled SiR material, e.g. HVDC grade SiR, $\rho_{SiR}$=resistivity of neat SiR formulation or 'base silicone" (usually a mixture of polydimethylsiloxane and fumed silica or any other filler that is not ATH), $\rho_{Fill}$=resistivity of neat SiR filled with 50 vol % of ATH.

All resistivities ($\rho$, $\rho_{Fill}$ and $\rho_{SiR}$) should be evaluated at room temperature (20° C.) and at a relative humidity (RH) of 50%.

Below the percolation threshold P is close to or approaching 0, whereas above the percolation threshold P is close to or approaching 1. Preferably, P is at most 0.5, such as below 0.4, 0.3, 0.2 or 0.1, to be regarded as below the percolation threshold. By combining relatively large ATH particles with relatively small ATH particles, the fill content may be increased while still being regarded as below the percolation threshold.

In embodiments of the present invention, the filled SiR material comprises at least 20 wt % ATH, in order to pass the electrical erosion test, e.g. within the range of 20-50 wt % ATH, or at least 20 wt %, 25 wt % or 30 wt % ATH, and/or at most 50 wt %, 45 wt % or 40 wt %, e.g. within the range of 25-50 wt %, 30-50 wt %, 20-40 wt %, 25-40 wt % or 30-40 wt %.

In embodiments of the present invention, the respective particle size distributions of the first and second ATH powders are such that the $d_{90}$ value of the second ATH powder is less than the $d_{10}$ value of the first ATH powder. Thus, typically only 10% of the particles of each powder overlaps with the other powder.

In some embodiments of the present invention, either the first or the second ATH powder has an average particle size ($d_{50}$ which is the average particle diameter by mass) within the range of 1-3 μm, such as within the range of 1.3-2.3 μm, and/or a $d_{10}$ value within the range of 0.3-1 μm, such as within the range of 0.6-0.9 μm, and/or a $d_{90}$ value within the range of 2-7 μm, such as within the range of 2.2-5.2 μm, which may herein be regarded as a standard powder which may be used as either the first or the second ATH powder. Preferably, the first or the second ATH powder has an average particle size ($d_{50}$) within the range of 1.3-2.3 μm, a $d_{10}$ value within the range of 0.6-0.9 μm, and a $d_{90}$ value within the range of 2.2-5.2 μm. The $d_{10}$ value is the diameter at which 10% of the sample's mass is comprised of particles with a diameter of less than said value. Similarly, the $d_{90}$ value is the diameter at which 90% of the sample's mass is comprised of particles with a diameter of less than said value.

In some embodiments, e.g. if the standard powder or the nanopowder (see below) is used as the second powder having relatively small particles, the first ATH powder may be a micropowder having an average particle size ($d_{50}$) within the range of 5-15 μm, e.g. within the range of 6-12 μm, such as within the range of 8-10 μm, such as about 9 μm. Such a micropowder may e.g. have a percentage which pass through a 325 mech (44 micrometre) of 99.98% and a BET surface area of 2 $m^2/g$.

In some embodiments, e.g. if the standard powder or the micrometre powder is used as the first powder having relatively large particles, the second ATH powder may be a nanopowder having an average particle size ($d_{50}$) within the range of 5-200 nm, e.g. within the range of 10-100 nm, or within the range of 5-20 nm such as about 10 nm, or within the range of 40-60 nm such as about 50 nm, or within the range of 80-120 nm such as within the range of 90-110 nm such as about 100 nm. Such a nanopowder may e.g. have a percentage which pass through a 325 mech (44 micrometre) of 99.99% and a BET surface area of 12 $m^2/g$.

In some embodiments of the present invention, one or both of the first and second ATH powders have been treated to have a hydrophobic surface, e.g. by a silane treatment, such that the hydrophobic surface is achieved by means of silane.

In some embodiments of the present invention, the first ATH powder constitutes between 50 to 90 wt % of the ATH mixture, and wherein the second ATH powder constitutes between 10 to 50 wt % of said ATH mixture. To use more (in wt %) of the larger particles of the first ATH powder than of the smaller particles in the second ATH powder has been advantageous in order to obtain high fill content below the percolation threshold. It should be noted that the number of smaller particles used from the second ATH powder may still be greater than the number of particles used from the first ATH powder, since the particles of the second ATH powder are much smaller and thus weighs less than the particles of the first ATH powder.

The filled SiR material may conveniently be used for making HV electrical insulators. In some embodiments, such an insulator is configured for a voltage within the range of 0.1-10 kV/mm, such as within the range of 0.1-1 kV/m m.

The insulator may be configured for use as an insulator in HVDC applications and/or for encapsulating power electronic device(s), i.e. semiconductor components e.g. in a converter or sensor. In some embodiments, the insulator is in the form of or otherwise comprised in an insulator device such as a wall bushing, a transformer bushing, a cable termination, a support insulator, a cable joint or a surge arrestor, preferably a wall bushing or a cable termination, e.g. in a HVDC application, especially when the filled SiR material is arranged with an outer surface exposed to air and ambient moisture. The insulator device may also comprise conventional parts such as epoxy insulator(s), capacitor body and/or insulation fluid such as oil or gas. Embodiments of the insulator may be especially useful in DC applications, where the varying resistivity of the insulator has a more detrimental effect.

FIG. 1 illustrates an embodiment of an insulator 1 formed of an embodiment of the filled SiR material 2. The insulator 1 surrounds an electrical conductor 3, e.g. of an HVDC system or other electrical power system (e.g. power grid or network), and may e.g. be part of a wall bushing, a transformer bushing, a cable termination, a support insulator, a cable joint or a surge arrestor, preferably a wall bushing or a cable termination. The outside of the insulator 1 is exposed to the ambient air and moisture, making it susceptible to absorption of moisture. The insulator 1 is made of the filled SiR material 2 of the present disclosure in order to reduce the moisture absorption. The filled SiR material 2 comprises ATH powder particles, here schematically illustrated by dots, 4 from the first and second powders, dispersed in SiR 5.

Figure 2:
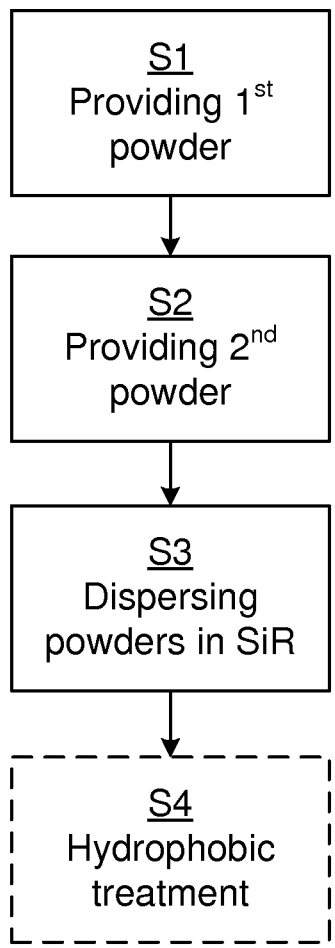
FIG. 2 is a schematic flow chart of embodiments of the method of the present disclosure.

FIG. 2 is a schematic flow chart illustrating embodiments of the method of the present invention. A first ATH powder is provided S1, and a second ATH powder is provided S2. The first and second ATH powders 4 are then dispersed S3 in SiR 5 to at least 20 wt % and below the percolation threshold of the filled SiR material 2 thus formed. The first and second powder particles 4 may be mixed prior to the dispersing S3, or they may be separately dispersed S3 in the SiR 5. As discussed herein, the particle size distribution of the first and second ATH powders 4 dispersed S3 are such that the $d_{90}$ value of the second ATH powder is less than the $d_{10}$ value of the first ATH powder.

Thus, the filled SiR material 2 may be prepared by an embodiment of the method of the present disclosure. In some embodiments, the method comprises treating S4 at least one of the first and second ATH powders to obtain a hydrophobic surface, before the dispersing S3 of the first and second ATH powders in SiR.

The resulting filled SiR material may then be used to manufacture an embodiment of the insulator of the present disclosure, e.g. for HVDC applications, for instance by using injection moulding, casting or extrusion; possibly followed by crosslinking using either peroxide or a platinum catalyst.

Embodiments of the present invention have at least some of the advantages of increased reliability, due to reduced complexity and increased predictability of the DC stress inside and around SiR insulated products e.g. for HVDC applications, and optimized design and reduced cost.

Example

Different types of ATH fillers 4, with and without hydrophobic surface treatment S4, were compounded S3 into silicone rubber 5 and compared with unfilled SiR at 25° C. and different RH varying from 10-90%.

The influence of humidity and temperature on the resistivity was evaluated and compared to the unfilled silicone rubber. Using surface-treated (vinyl-silane treatment), hydrophobic ATH, both the moisture adsorption, as well as leakage of ionic contamination from the filler was reduced. This resulted in silicone rubber with a resistivity in the range of 1E12-1E14 Ohm·m. In the same way, a hydrophilic, low resistivity grade of ATH can be used for the manufacturing of silicone rubber with lower resistivity (1E10-1E12 Ohm·m). These results illustrate how the conductivity of the silicone rubber can be influenced by the type of ATH-filler used.

The present disclosure has mainly been described above with reference to a few embodiments. However, as is readily appreciated by a person skilled in the art, other embodiments than the ones disclosed above are equally possible within the scope of the present disclosure, as defined by the appended claims.

The invention claimed is:

1. An electrical insulator made from a filled silicone rubber, SiR, material comprising 20-50 wt % of alumina tri-hydrate, ATH, as a filler dispersed in SiR to below the percolation threshold, wherein the ATH is a mixture of a first ATH powder and a second ATH powder, the particle size distribution of the first ATH powder and the second ATH powder being such that the $d_{90}$ value of the second ATH powder is less than the $d_{10}$ value of the first ATH powder.

2. The insulator of claim 1, wherein the first ATH powder or the second ATH powder has an average particle size, $d_{50}$, within a range of at least one of 1-3 nm or 1.3-2.3 nm, and/or a $d_{10}$ value within at least a range of 0.3-1 nm or 0.6-0.9 nm, and/or a $d_{90}$ value within at least a range of 2-7 nm or 2.2-5.2 nm.

3. The insulator of claim 1, wherein the first ATH powder has an average particle size, $d_{50}$, within the range of at least one of 5-15 nm, 6-12 nm, or 8-10 nm.

4. The insulator of claim 1, wherein the second ATH powder has an average particle size, $d_{50}$, within the range of at least one of 5-200 nm, 10-100 nm, 5-20 nm, 40-60 nm, 80-120 nm or 90-110 nm.

5. The insulator of claim 1, wherein one or both of the first ATH powder and the second ATH powder have been treated to have a hydrophobic surface.

6. The insulator of claim 5, wherein the hydrophobic surface is by means of silane.

7. The insulator of claim 1, wherein the SiR material includes at least at least 30 wt % ATH.

8. The insulator of claim 1, wherein the first ATH powder constitutes 50-90 wt % of the ATH mixture, and wherein the second ATH powder constitutes 10-50 wt % of said ATH mixture.

9. The insulator of claim 1, wherein the insulator is a high-voltage, HV, electrical insulator.

10. The insulator of claim 9 configured to operate at a voltage within the range of 0.1-10 kV/mm.

11. The insulator of claim 9 configured to encapsulate at least one power electronic device.

12. The insulator of claim 9, wherein the insulator is used in a high-voltage direct current, HVDC, application.

13. The insulator of claim 12, wherein the insulator is included in a wall bushing, a transformer bushing, a cable termination, a support insulator, a cable joint or a surge arrestor.

14. A method for preparing an electrical insulator of a filled SiR material, the method comprising:
   providing a first ATH powder;
   providing a second ATH powder;
   dispersing the first and second ATH powders in SiR to 20-50 wt % and below the percolation threshold of the electrically insulating filled SiR material thus formed;
   wherein the particle size distribution of the first ATH powder and the second ATH powder are such that the $d_{90}$ value of the second ATH powder is less than the $d_{10}$ value of the first ATH powder.

15. The method of claim 14, further comprising:
   treating at least one of the first and second ATH powders to obtain a hydrophobic surface, before the dispersing.

16. The insulator of claim 10 configured to encapsulate at least one power electronic device.

\* \* \* \* \*